United States Patent [19]

Koyama

[11] Patent Number: 5,386,404
[45] Date of Patent: Jan. 31, 1995

[54] OPTICAL INFORMATION PROCESSING APPARATUS

[75] Inventor: Osamu Koyama, Kawasaki, Japan

[73] Assignee: Canon Kabushiki Kaisha, Tokyo, Japan

[21] Appl. No.: 47,011

[22] Filed: Apr. 14, 1993

Related U.S. Application Data

[63] Continuation of Ser. No. 581,581, Sep. 12, 1990, abandoned.

[30] Foreign Application Priority Data

Sep. 14, 1989 [JP] Japan ................. 1-237185

[51] Int. Cl.$^6$ ............................................. G11B 7/00
[52] U.S. Cl. ............................. 369/44.23; 369/44.32; 369/44.28
[58] Field of Search ........... 369/32, 33, 44.11, 44.14, 369/44.21, 44.25, 44.28, 44.29, 54, 59, 44.32, 100, 110, 111, 112, 44.23; 360/78.05, 78.06

[56] References Cited

U.S. PATENT DOCUMENTS

| | | | |
|---|---|---|---|
| 4,736,353 | 4/1988 | Kasai et al. | 369/44.29 |
| 4,803,579 | 2/1989 | Koyama | 360/114 |
| 4,813,032 | 3/1989 | Koyama | 369/13 |
| 4,853,917 | 8/1989 | Koyama et al. | 369/44.15 |
| 4,866,687 | 9/1989 | Kasai et al. | 369/33 |
| 4,953,124 | 8/1990 | Koyama | 365/122 |
| 4,969,137 | 11/1990 | Sugiyama et al. | 369/112 |
| 5,063,549 | 11/1991 | Yamamuro | 369/32 |
| 5,159,588 | 10/1992 | Nakano et al. | 369/44.14 |

*Primary Examiner*—Aristotelis Psitos
*Assistant Examiner*—Nabil Hindi
*Attorney, Agent, or Firm*—Fitzpatrick, Cella, Harper & Scinto

[57] ABSTRACT

An optical information processing apparatus for recording and/or reproducing information by forming a small light spot on a disk. The optical head is so constructed that the amount of displacement of the light spot, resulting from vibration or inclination of the optical head or its movable part, does not exceed 1/10 of the track pitch or the speed of displacement of the light speed does not exceed 0.2% of the rotating speed of the disk, so that the time required for a seeking or operation can be reduced, and the operation of the servo system of the optical head can be stabilized.

10 Claims, 14 Drawing Sheets

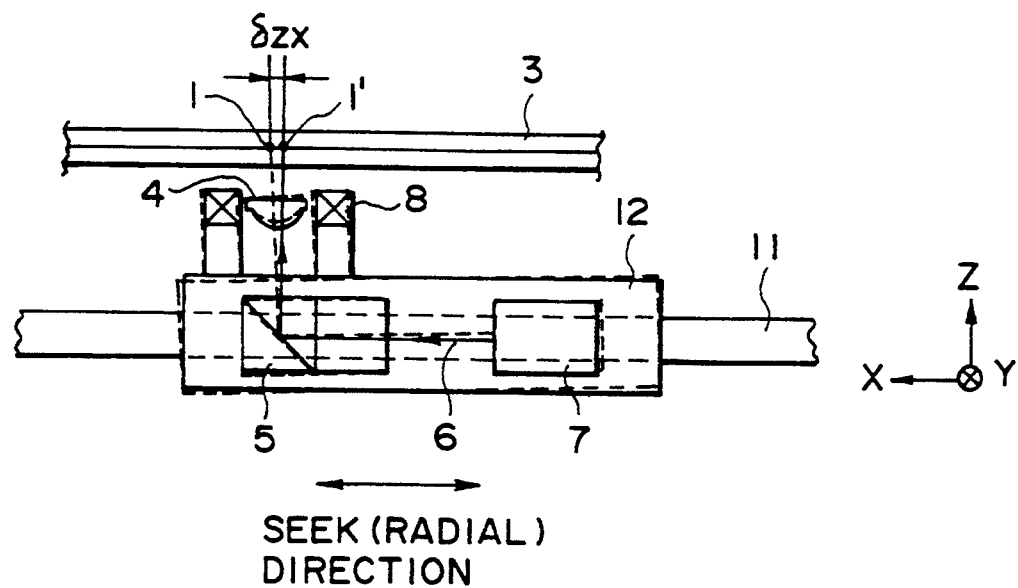
F I G. IA
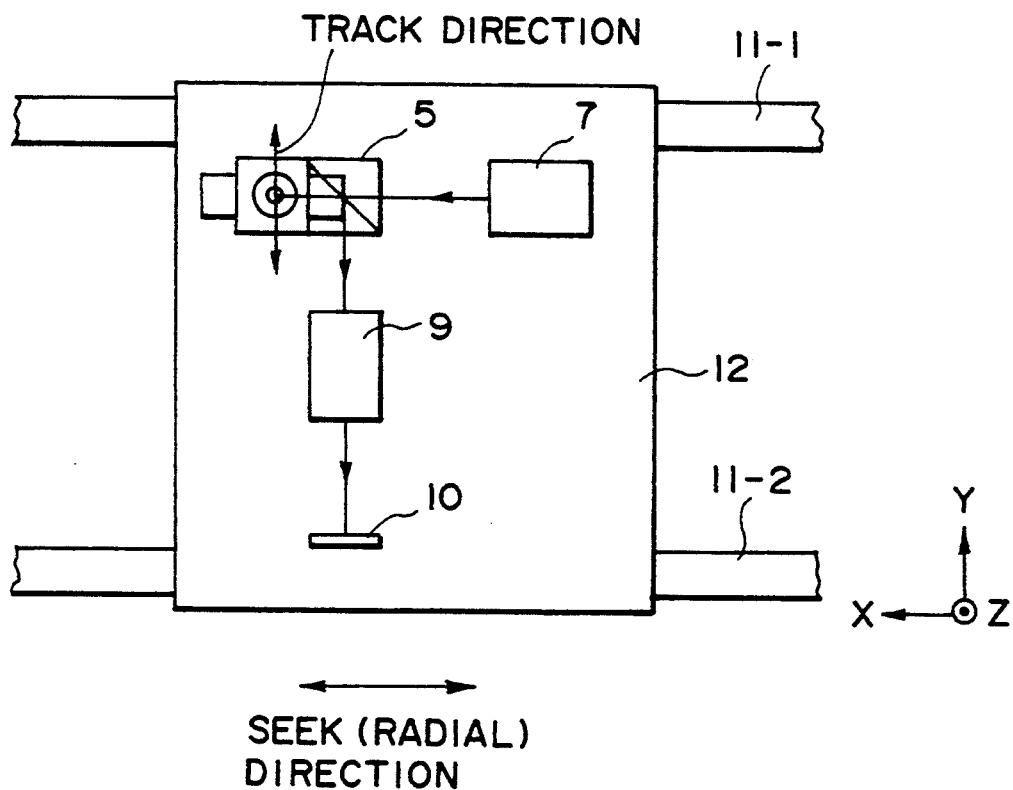
F I G. IB

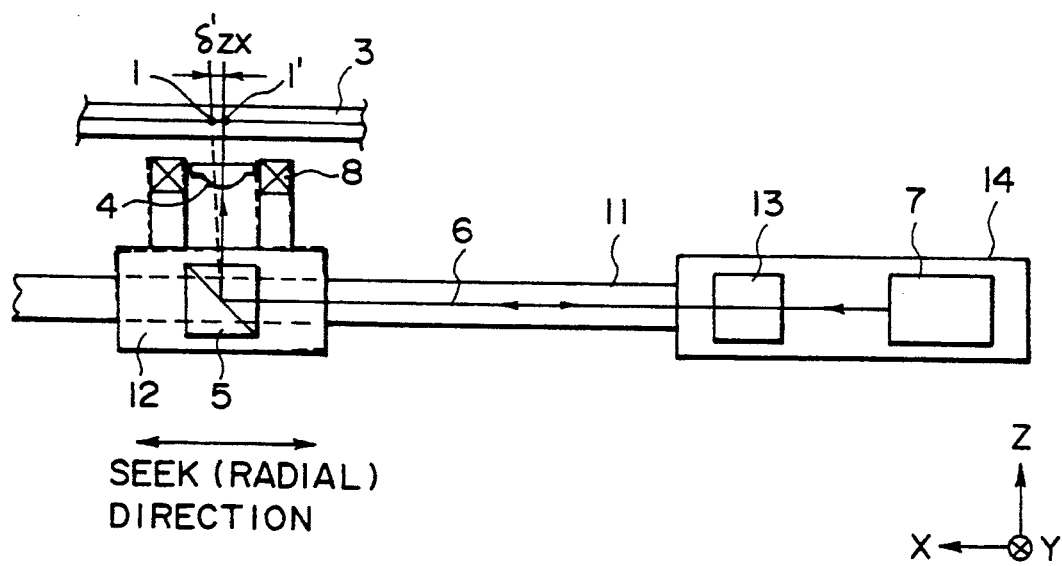
F I G. 2A
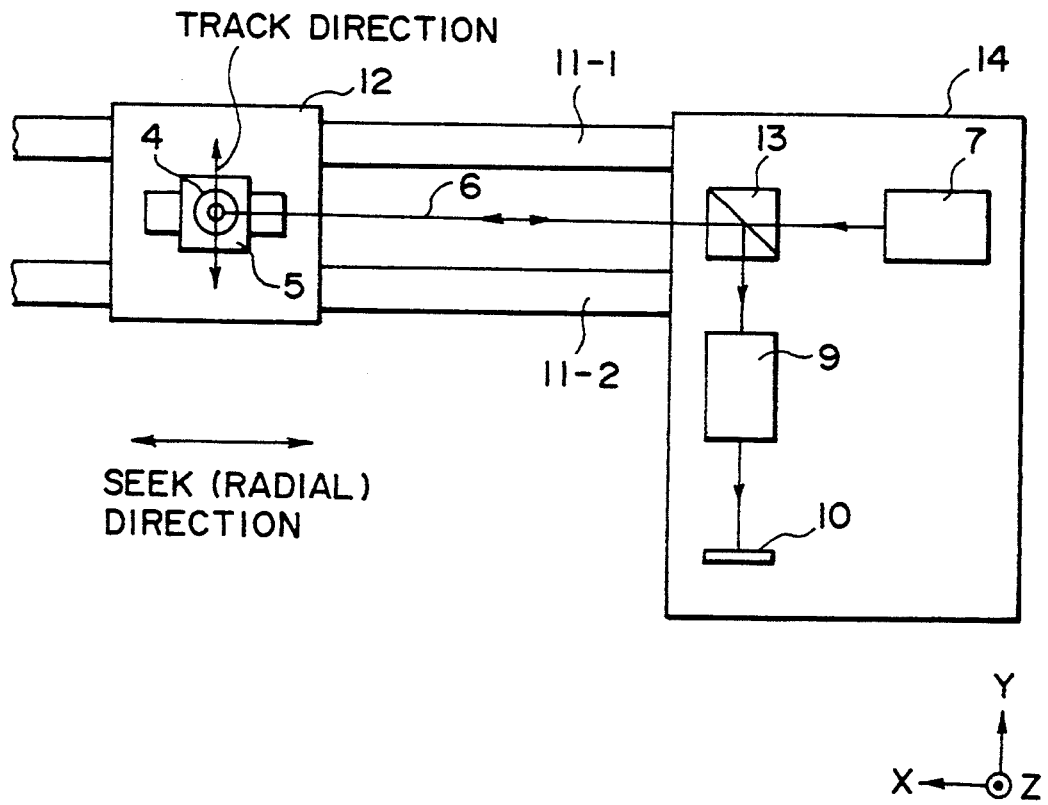
F I G. 2B

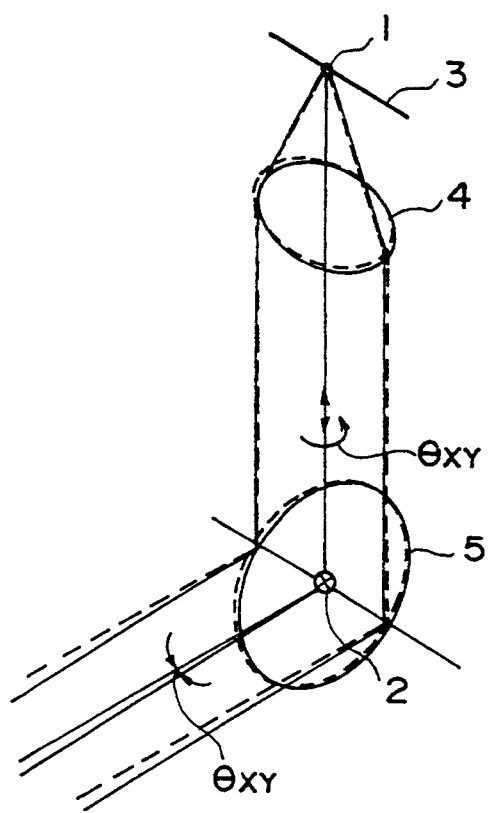
F I G. 7
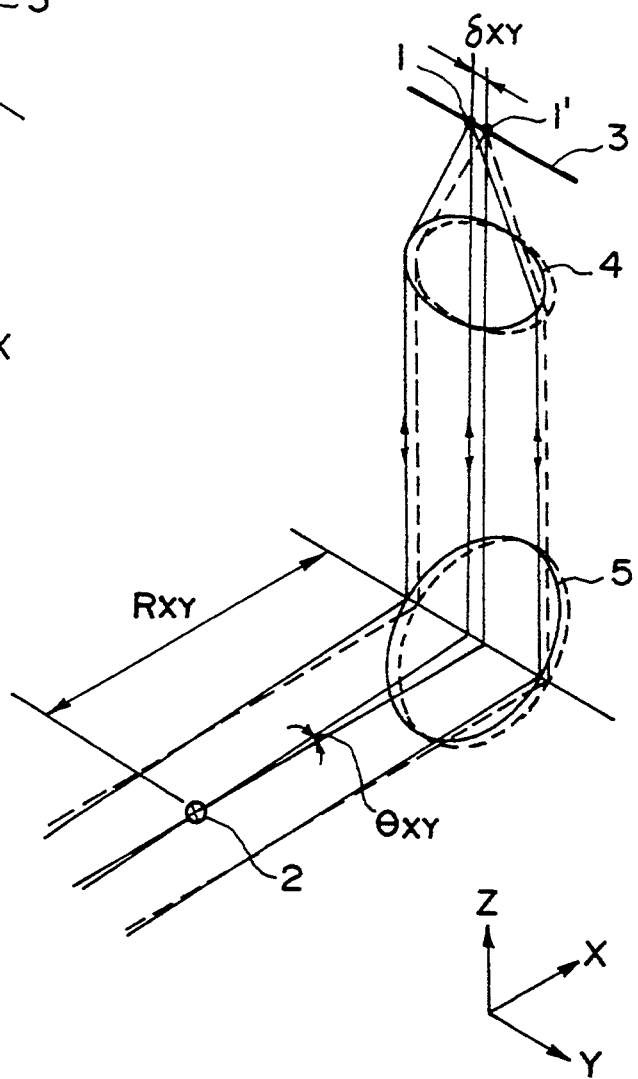
F I G. 8

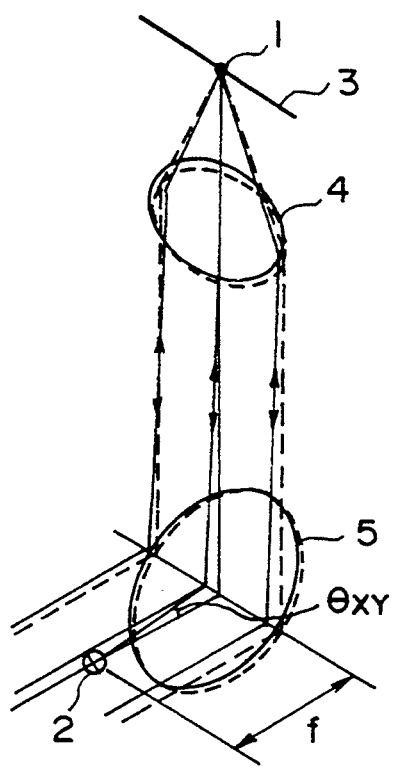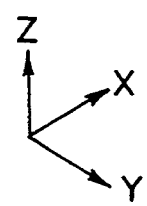
F I G. 12
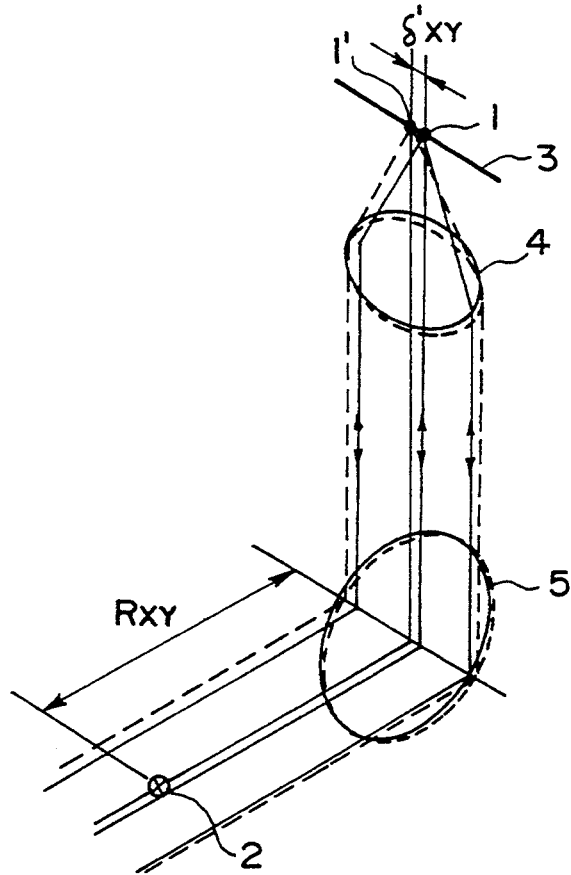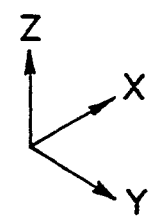
F I G. 13

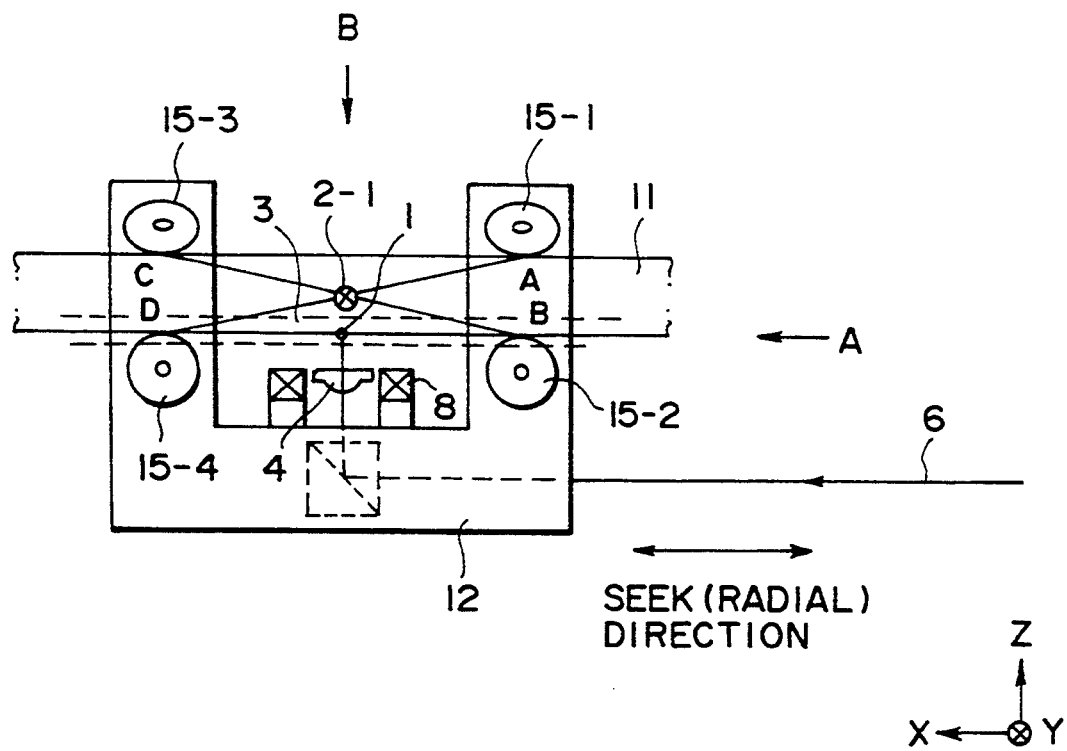
F I G. 14A
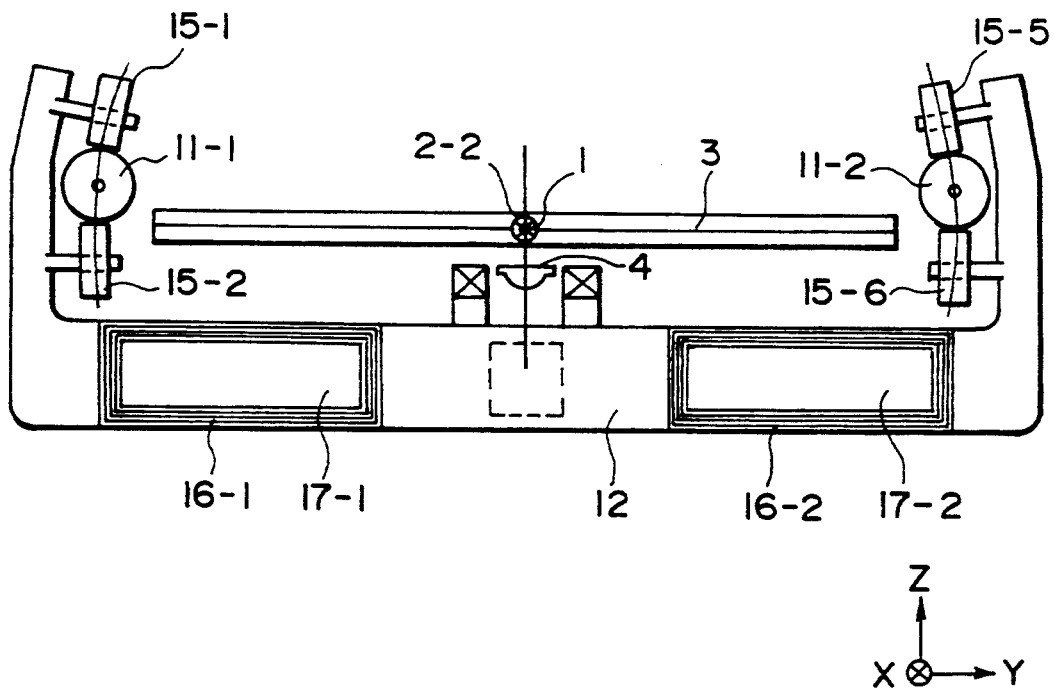
F I G. 14B

OPTICAL INFORMATION PROCESSING APPARATUS

This application is a continuation, of application Ser. No. 07/581,581 filed Sep. 12, 1990, now abandoned.

BACKGROUND OF THE INVENTION

1. Field of the Invention

The present invention relates to an optical information processing apparatus for optically recording and-/or reproducing information by focusing a small optical spot on an information recording medium such as an optical disk or a magnetooptical disk.

2. Related Background Art

When a rewritable information recording medium such as an optical disk or a magnetooptical disk is used as the external memory of a computer, there is required high random access speed. For improving the access speed, it is important to reduce the weight of the movable part of the optical head and to reduce the vibration of the actuator during a coarse seeking operation by a linear motor or the like. The weight reduction of the movable part of the optical head is achieved by the use of a separated optical system in which a movable part, including the objective lens, mirror etc. of the optical head, is separated from fixed parts such as the laser and photosensor system, and the seeking operation is conducted by moving the movable part alone with the actuator. Also for reducing the vibration of the actuator, there are already known a method of locking the actuator during the seeking operation and a method of employing a slidable shaft actuator in which the movable part is moved with respect to a shaft positioned at the center of gravity of the movable part, and such methods are utilized for reducing the time required for tracking.

However, the optical head or the movable part thereof may still cause vibrations in the seeking operation even if such measures are taken, and such vibrations become more conspicuous in case the access of a higher speed is intended or in case a higher coarse seeking speed is used with a movable part of a lower weight.

These phenomena will be explained in more detail with reference to FIGS. 1A, 1B, 2A and 2B. FIGS. 1A and 1B illustrate a typical optical information processing apparatus in which the entire optical head is moved, during the seeking operation, with respect to an optical disk 3 constituting the information recording medium. A light beam emitted from a semiconductor laser unit 7 is converted into a parallel beam 6 by a collimating lens (not shown), and is directed toward a polarizing beam splitter 5. The light beam is deflected by the splitter 5 toward an objective lens 4, which focuses the light beam as a light spot 1' on the optical (or magnetooptical) disk 3. The light spot 1' is subjected to focus servo and tracking servo operations, achieved by receiving the reflecting light from the disk 3 by a sensor 10 through a condenser lens 9 fixed on a base plate 12 of the optical head and converting the light into an electrical signal, and the light spot is positioned, with respect to a target track, with a precision of ±1 μm in the focusing operation and ±0.1 μm in the tracking operation. An actuator 8 is provided for precise access movement of the objective lens 4 in the focusing and tracking directions. The above-mentioned sensor 10 serves to provide not only the servo signals but also an RF signal for information reproduction, corresponding to the reflected light. In the coarse seeking operation, the above-mentioned base plate 12 is moved, along rails 11, in the radial (seeking) direction of the disk 3. A yoke and a coil constituting a linear motor, for moving the base plate 12, namely the entire optical head, are not illustrated.

An optical information processing apparatus shown in FIGS. 2A and 2B employs a separated optical system in which the polarizing beam splitter 5, objective lens 4 and actuator 8 are mounted on the base plate 12, while other components of the optical head such as the semiconductor laser unit 7 and the sensor 10 are mounted on a fixed base plate 14 whereby a fixed part and a movable part are separated. A beam splitter 13 is provided on the fixed base plate 14 for separating the reflected light from the movable part toward a condenser lens 9. Other structures are the same as shown in FIGS. 1A and 1B.

A possible problem in such an apparatus lies in the vibration of the base plate 12 for example in the z-x plane, during the coarse seeking operation by the linear motor, due to a gap between the base plate 12 and the rails 11, or due to an elastic deformation of the base plate 12. Such vibration causes a displacement of the light spot 1' by an amount $\delta_{zx}$ in the radial direction to a spot position 1, due to the inclination of the base plate 12. The amount $\delta_{zx}$ easily amounts to several microns depending on the inclination of the base plate 12 and the position of center of the inclination, and may seriously affect the time required for releasing the actuator 8 from the locked state and aligning the actuator with the track. The vibration of the base plate 12 may also occur in the y-z plane or in the x-y plane, depending on the position of the center of the inclination. The vibration of the base plate 12 in the y-z plane displaces the light spot 1' by $\delta_{yz}$ along the direction of track. Such displacement will generate a jitter component, and will seriously affect the stability of the servo system in an optical information processing apparatus employing a sampling servo system.

Also the vibration of the base plate 12 in the x-y plane causes a displacement of the light spot in the radial direction or in the track direction depending on the position of the center of the inclination, and similarly affects the stability of the servo system as in the above-explained case.

Particularly the amount $\delta_{zx}$ in the separated optical system shown in FIGS. 2A and 2B is larger than the amount $\delta_{zx}$ in FIGS. 1A and 1B, thus more seriously affecting the time required for tracking. The vibration may also occur in the y-z plane or in the x-y plane.

As explained above, conventional structures have been associated with the undesirable influence on the stability of the servo system, due to the displacement of the light spot 1' to another position 1 on the disk 3 at the seeking operation of the optical head, due to the inclination or vibration of the optical head or its movable part (base plate 12).

SUMMARY OF THE INVENTION

In consideration of the foregoing, an object of the present invention is to provide an optical information processing apparatus in which the displacement of the light spot on the recording medium, resulting from the inclination of the optical head or the movable part thereof at the seeking operation, does not affect the stability of the servo system.

The above-mentioned object can be attained, according to the present invention, by an optical information processing apparatus for optically recording and/or reproducing information by focusing a small light spot on the recording medium, in which the center of inclination of the optical head or the movable part thereof, to be moved for moving the light spot to a certain position on the recording medium, is positioned with respect to the seeking direction and/or track direction in such a manner that the amount of displacement of the light spot on the recording medium, resulting from vibration or resonance of the optical head or the movable part in the movement, is limited within a predetermined tolerance range.

It is therefore rendered-possible to reduce the time required for tracking by the fine actuator, to improve the stability of the servo system and to achieve a higher access speed.

BRIEF DESCRIPTION OF THE DRAWINGS

FIGS. 1A, 1B, 2A and 2B are elevation views and plan views showing examples of optical information processing apparatus;

FIGS. 7 and 8 are views of optical path relating to the center of inclination of the optical head in the x-y plane;

FIGS. 12 and 13 are views of the optical path relating to the center of inclination of the optical head in the x-y plane; and FIGS. 14A, 14B and 14C are respectively an elevation view, and views seen in directions A and B, of an embodiment of the optical head of a separated optical system of the present invention.

DESCRIPTION OF THE PREFERRED EMBODIMENTS

Figure 3:
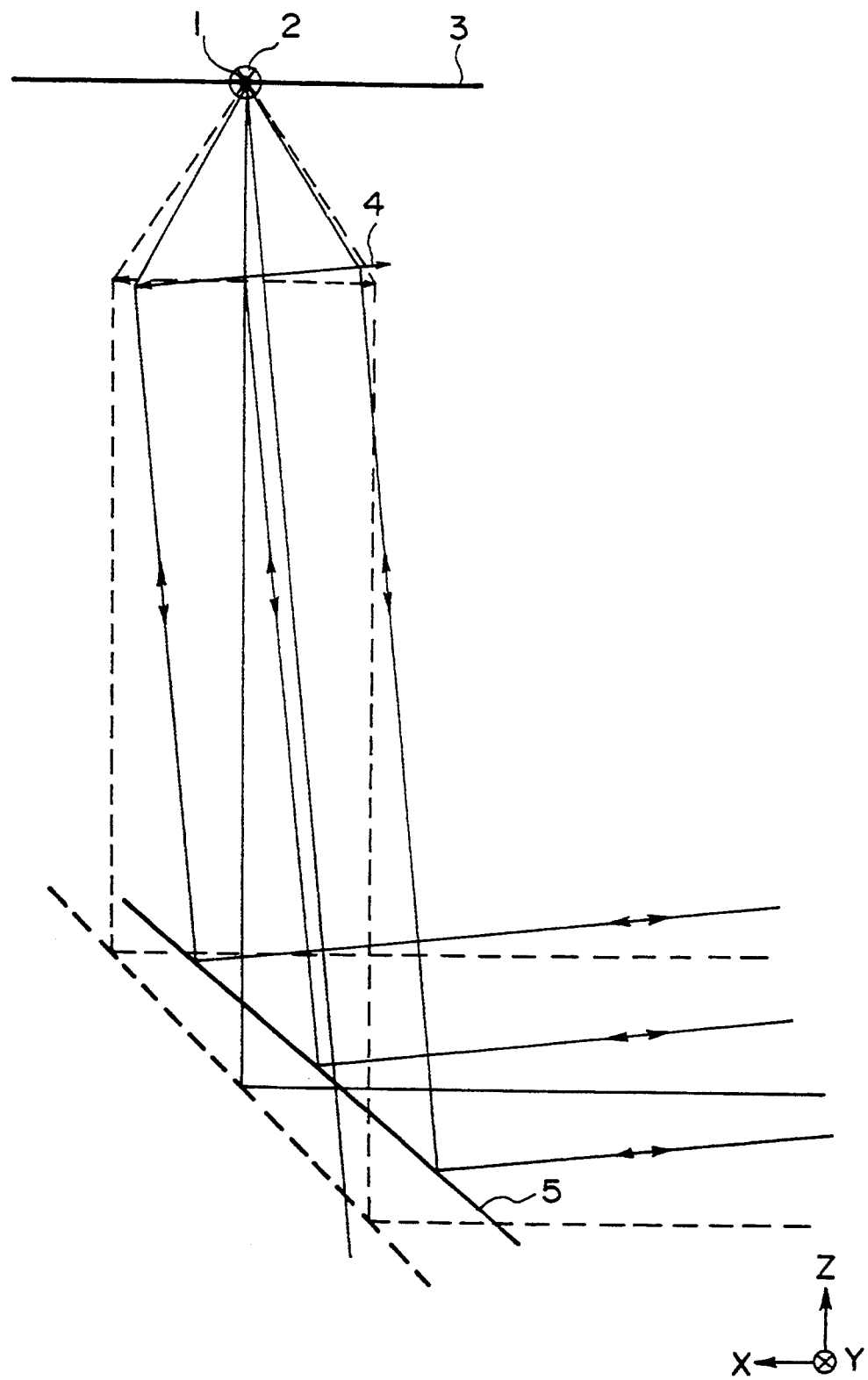
FIGS. 3 and 4 are views of the optical path relating to the center of inclination of the optical head, in the z-x plane, in an embodiment of the present invention.
Figure 4:
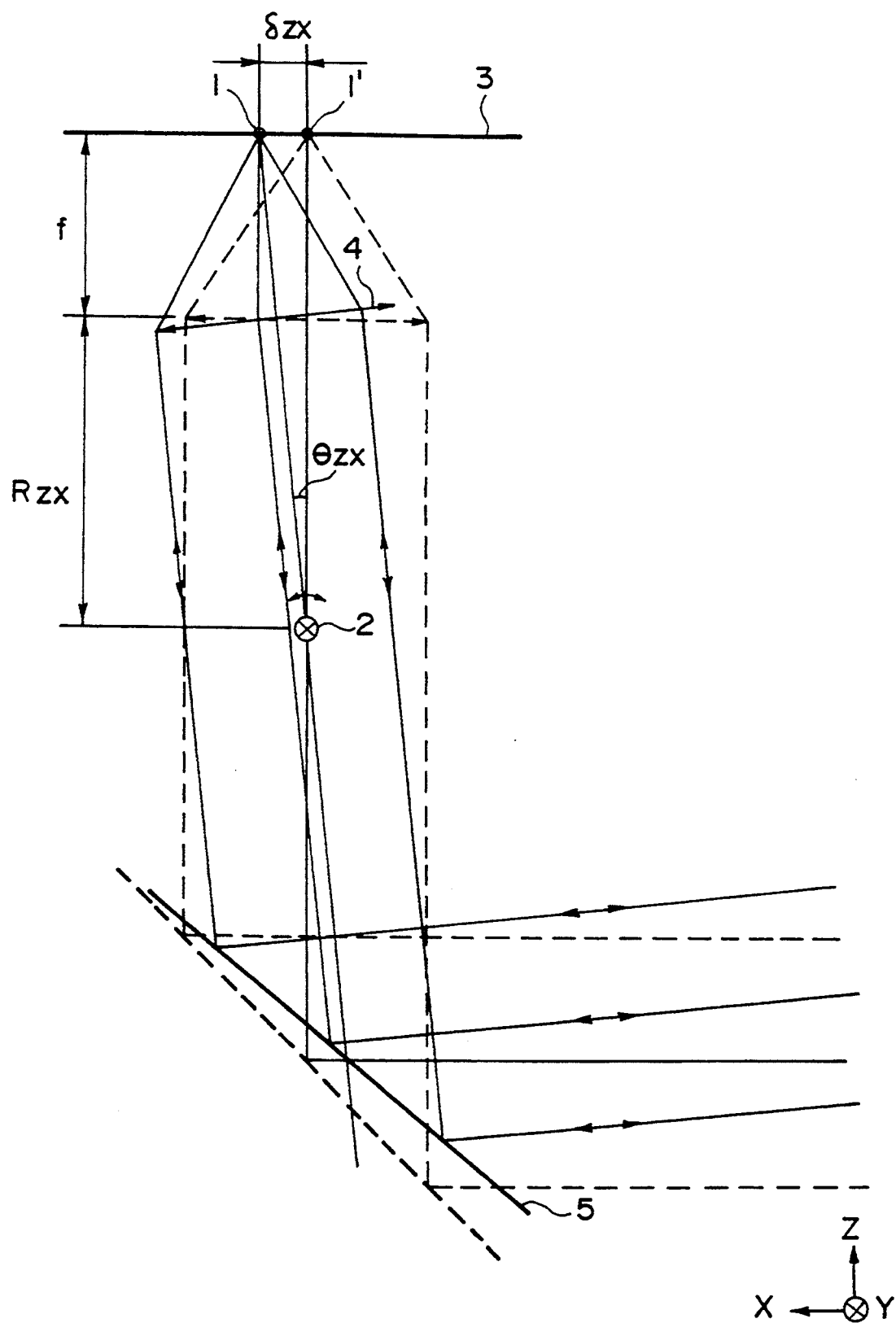

Now the present invention will be clarified in greater detail by preferred embodiments thereof shown in the attached drawings, wherein the same components as those in the conventional structures are represented by the same numbers. In a first embodiment which will be explained in the following with reference to FIGS. 3 and 4, the entire optical head is mounted on the base plate 12 and is moved along the rails 11. FIGS. 3 and 4 indicate the case of vibration or inclination of the base plate 12 in the z-x plane. Referring to FIG. 4, a light spot 1 on the optical disk 3 corresponds to an inclination $\theta_{zx}$ of the base plate 12 (not shown) while a light spot 1' corresponds to a state $\theta_{zx}=0$, and the distance between the spots 1' and 1 is represented by $\delta_{zx}$. A numeral 2 indicates the center of inclination of the base plate 12, and can be considered as an equivalent center of inclination inducing the displacement of the light spot 1 when the base plate 12 is twisted or inclined by vibration or resonance. For the purpose of simplicity, the objective lens 4 is represented as a thin single lens, but the present invention is naturally applicable to the objective lens of other structures. In the present embodiment, a numeral 5 indicates a mirror for deflecting the light beam.

In case the base plate 12 is inclined (or vibrates) in the z-x plane for example due to a gap between the base plate 12 and the rails 11, the inclination of the light beam entering the objective lens 4 and the mirror 5 does not change but the inclination of the light beam entering the disk 3 changes. The amount of displacement $\delta_{zx}$ on the disk 3 is given by:

$$\delta_{zx} = (f + R_{zx}) \cdot \tan\theta_{zx} \quad (1)$$

wherein $\theta_{zx}$ is the inclination, $R_{zx}$ is the distance from the center of inclination to the objective lens in the Z-direction (distance from the center of inclination to the optical axis in the x-direction being taken as zero for the purpose of simplicity), and f is the focal length of the objective lens 4.

As will be apparent from the equation (1), $\delta_{zx}$ can be reduced by $f + R_{zx} \to 0$. In FIG. 3, $f + R_{zx} = 0$ so that the center 2 of the inclination coincides with the position of light spot on the disk 3. Also even if $f + R_{zx}$ cannot be brought to zero, the time required for tracking can be reduced by maintaining the amount of displacement within a tolerance range.

For example, when $|f + R_{zx}|$ is defined by the following relation:

$$|f + R_{zx}| \leq \delta_{zx}/\tan\theta_{zx} \approx 5 \times 10^{-5}/\tan\theta_{zx} \, (mm) \quad (2)$$

the stability of the servo system can sufficiently meet a tolerance of 0.1 μm for the tracking error for a disk with a track pitch (pitch of tracking tracks) of 1.6 μm even if the frequency $f_o$ of vibration of the base plate 12 is close to the gain crossing frequency $f_c$ of the tracking servo system. For example, for a case $\theta_{zx} = 2''$, there can be selected $|f + R_{zx}| \approx 5$ mm. In general, for a vibraiton with a frequency $f_0$ sufficiently lower than $f_c$, the tracking error $\delta''_{zx}$ without tracking servo is represented by the following equation, based on the equation (1):

$$\delta''_{zx} = |f + R'_{zx}| \cdot \tan\theta''_{zx} \quad (1')$$

so that the tracking error $\delta_{zx}$ under tracking servo is represented by:

$$\delta_{zx} \approx 1/G_0 \cdot \delta''_{zx} = 1/G_0 \cdot |f + R'_{zx}| \cdot \tan\theta''_{zx} \quad (1'')$$

wherein $G_0$ is the gain of the tracking servo system, the $G_0$ being sufficiently larger than unity; $\delta''_{zx}$ is the inclination; and $R'_{zx}$ is the distance in the z-direction from the center of inclination to the objective lens.

In order that the tracking error does not exceed the tolerance of 0.1 μm in a disk with a track pitch for example of 1.6 μm, the following relation is satisfied:

$$|f + r'_{zx}| \leq G_0 \cdot \delta_{zx}/\tan\theta''_{zx} \approx 5 \times 10^{-5} \cdot G_0/\tan\theta''_{zx} \, (mm) \quad (2')$$

If the vibration frequency $f_0$ is close to $f_c$, $G_0$ is considered as nearly equal to 1. If $f_0$ is lower than that $f_c$, $\theta_{zx}$ and $|f + R_{zx}|$ may be further increased.

Figure 5:
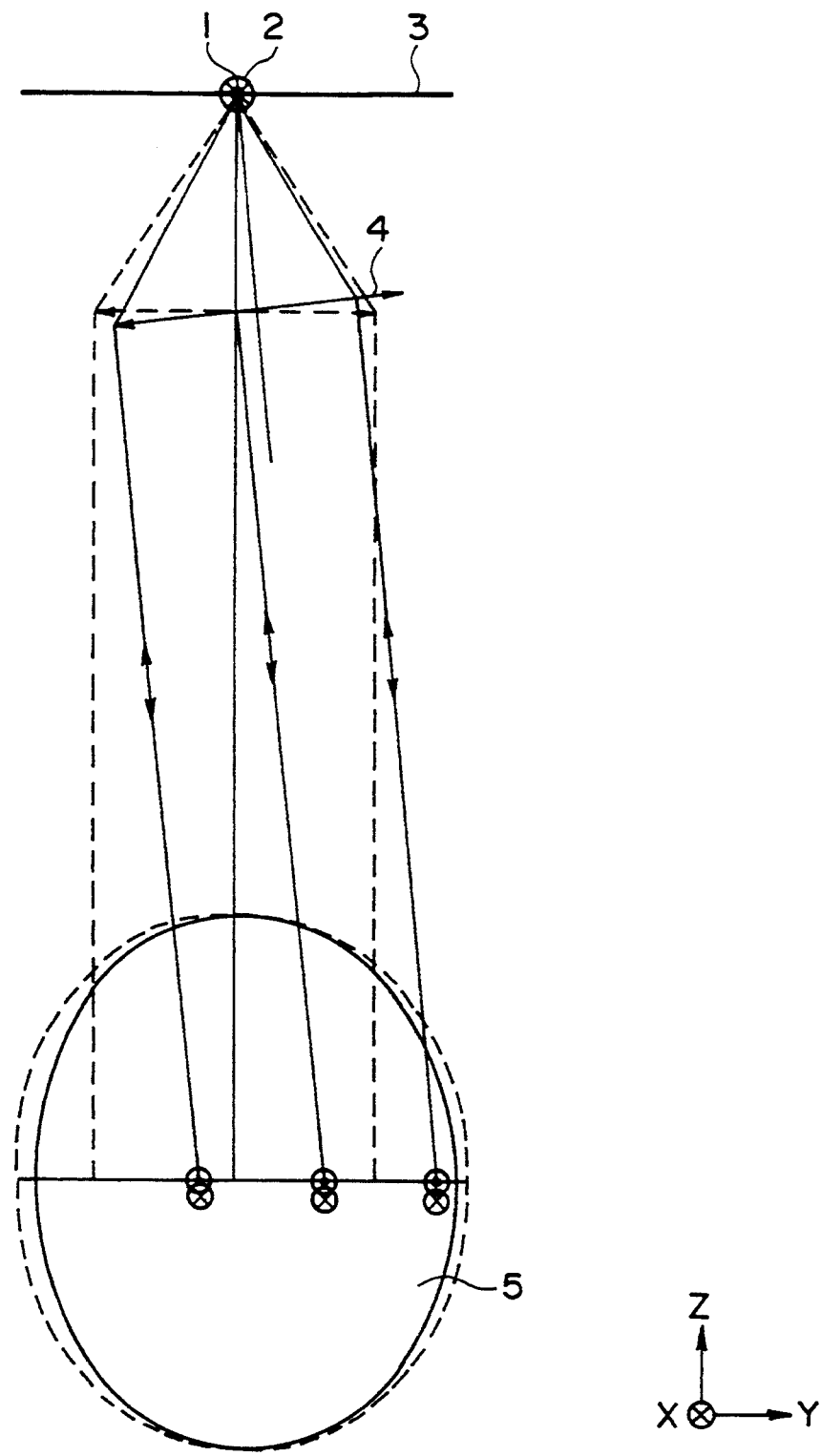
FIGS. 5 and 6 are views of optical path relating to the center of inclination of the optical head in the y-z plane.
Figure 6:
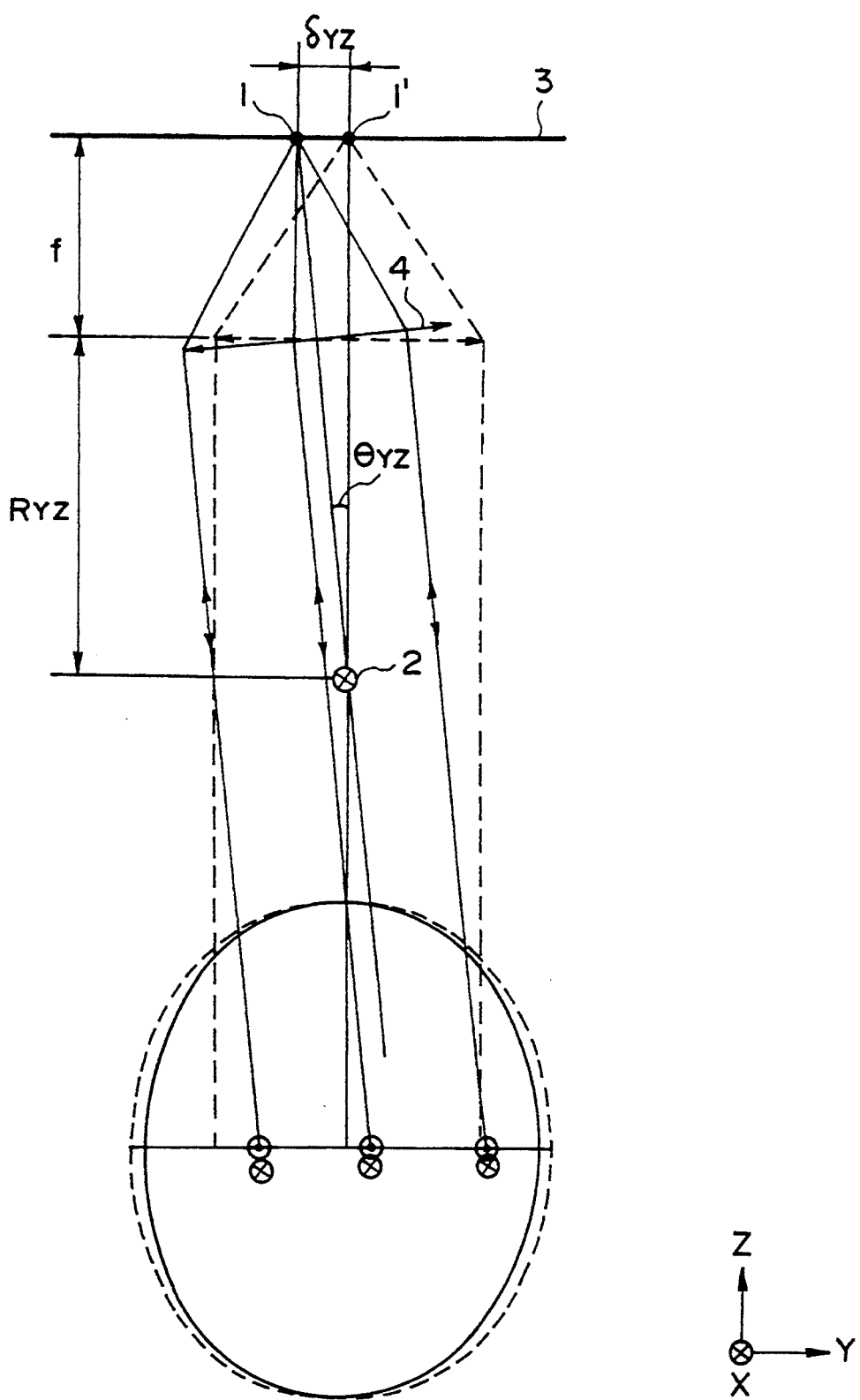

In the following there will be explained a second embodiment of the present invention with reference to FIGS. 5 and 6, showing the case that the inclination or vibration of the base plate 12 occurs in the y-z plane. Referring to FIG. 6, a light spot 1 corresponds to the position on the disk 3 displaced by an inclination $\theta_{yz}$ of the base plate 12, while a light spot 1' corresponds to a state $\theta_{yz} = 0$, and the distance between the spots 1' and 1 is represented by $\delta_{yz}$. A numeral 2 indicates the center of inclination of the base plate 12, and can be considered as an equivalent center of inclination inducing the displacement of the light spot 1 when the base plate 12 is twisted or inclined.

When the base plate 12 is inclined or vibrates in the y-z plane for example because of the gap between the base plate 12 and the rails 11 as in the foregoing embodiment, the inclination of the light beam entering the objective lens 4 and the mirror 5 does not change but the inclination of the light beam entering the disk 3 changes. The amount $\delta_{yz}$ of displacement of the light spot on the disk is represented by:

$$\delta_{yz} = (f + R_{yz}) \tan \theta_{yz} \quad (3)$$

wherein $\theta_{yz}$ is the inclination, which is assumed to be a small angle; $R_{yz}$ is the distance in the z-direction from the center of inclination to the objective lens (distance from the center of inclination to the optical axis in the y-direction being assumed to be zero for the purpose of simplicity); and f is the focal length of the objective lens. As will be apparent from the equation (3), $\delta_{yz}$ can be reduced by $f + R_{yz} \to 0$. In FIG. 5, $f + R_{yz} = 0$ so that the center 2 of inclination coincides with the light spot on the disk 3.

Even when $f + R_{yz}$ cannot be reduced to zero, the stability of the servo system will not be a problem even in an optical information processing apparatus employing a sampling servo system, if $|f + R_{yz}|$ is within a range indicated below:

$$|f + R_{yz}| \leq \delta_{yz}/\tan\theta_{yz} \approx 5 \times 10^{-4}/\tan\theta_{yz} \ (mm) \quad (4)$$

If the light spot is displaced or vibrates in the direction of track in a sampling servo system, the permissible jitter for tracking precision is about 0.2% of the disk rotating speed.

The linear speed $v_d$ at a disk radius r is represented by $v_d = 2\pi r f_d$ wherein $f_d$ is the rotating frequency. On the other hand, the maximum linear speed in the displacement (vibration) of the light spot is represented by $v\delta = 2\pi f_0 \cdot \delta_{yz}$ wherein $\delta_{yz}$ is the amplitude and $f_0$ is the frequency of vibration. Consequently, if the worst situation is considered to occur when $f_0$ is close to the gain crossing frequency $f_c$ of the phase locked loop, the permissible jitter is given by:

$$v\delta/v_d = f_c \delta_{yz}/r f_d \leq 0.002.$$

The constants are dependent on each servo system of the optical head, but there can be obtained:

$$\delta_{yz} < 5 \times 10^{-4}$$

for the conditions of r=25 mm, $f_c$=3 kHz and $f_d$=30 Hz (disk revolution 1,800 rpm) around the innermost track of a 3.5-inch optical disk.

Thus, in the equation (4), a condition $\theta_{yz} = 5''$ can be obtained by $|f + R_{yz}| \approx 20$ mm. Also as in the case of tracking servo, if $f_0$ is lower than $f_c$, $\theta_{yz}$ and $|f + R_{yz}|$ may be increased further.

FIGS. 7 and 8 illustrate a third embodiment of the present invention, in which the inclination or vibration of the base plate 12 occurs in the x-y plane. In FIG. 8, a light spot 1 indicates the position, on the disk 3, displaced by the inclination $\theta_{xy}$ of the base plate 12, while a light spot 1' corresponds to $Q_{xy} = 0$, and the distance between the spots 1' and 1 is represented by $\delta_{xy}$. In FIG. 7, the center 2 of inclination is distant by $R_{xy}$ in the x-direction from the optical axis, so that the displacement $\delta_{xy}$ of the light spot appears in the direction of track (y-direction). If the center of inclination is distant by $R_{xy}$ in the y-direction from the optical axis, the displacement $\delta_{xy}$ of the light spot appears in the seeking (radial) direction (x-direction). The center 2 of inclination can be considered as an equivalent center of inclination inducing the displacement of the light spot 1, by twisting or vibration of the base plate 12.

It will be understood that, when the base plate 12 is inclined or vibrates in the x-y plane by the gap between the base plate 12 and the rails 11, the inclination of the light beam does not change and the light spot on the disk displaces in a parallel manner. The amount $\delta_{xy}$ of displacement of the light spot on the disk 3 is represented by:

$$\delta_{xy} \approx R_{xy} \tan\theta_{xy} \quad (5)$$

wherein $\theta_{xy}$ is the inclination and $R_{xy}$ is the distance from the center of inclination to the optical axis in the x- or y-direction.

As will be apparent from the equation (5), $\delta_{xy}$ can be reduced by bringing $R_{xy}$ to zero. In FIG. 7, the center 2 of inclination coincides with the optical axis. Also when $R_{xy}$ cannot be brought to zero, the stability of the servo system will not be a problem as in the first and second embodiments if $R_{xy}$ is within a range defined by the relation (6) or (7) indicated below:

if $\delta_{xy}$ is in the seeking (radial) direction:

$$(R_{xy})_y \leq 5 \times 10^{-5}/\tan\theta_{xy} \ (mm) \quad (6), or$$

if $\delta_{xy}$ is in the track direction:

$$(R_{xy})_x \leq 5 \times 10^{-4}/\tan\theta_{xy} \ (mm) \quad (7)$$

wherein $R_{(xy)x}$ and $(R_{xy})_y$ are respectively x- and y-components of $R_{xy}$.

Figure 9A:
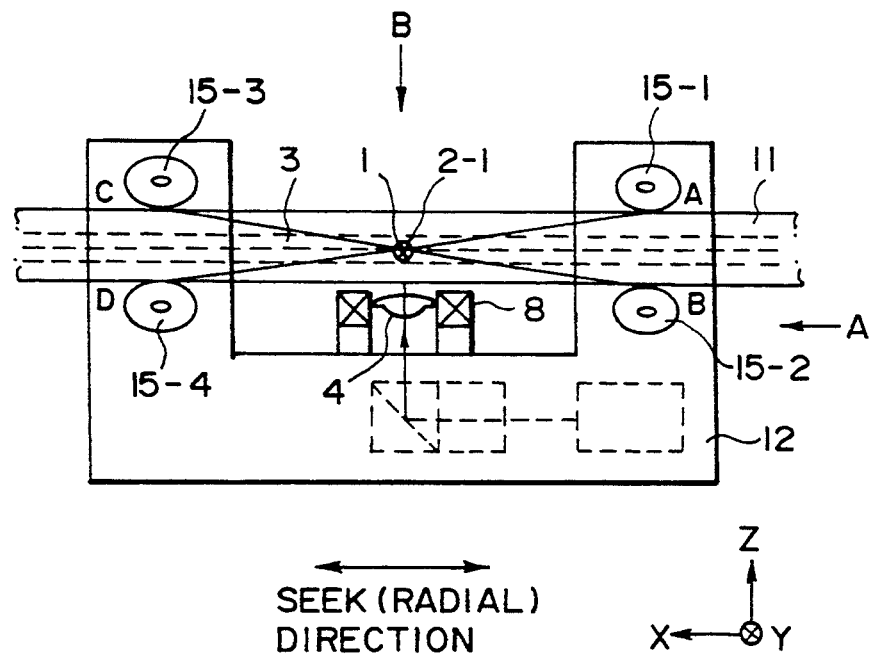
FIGS. 9A, 9B and 9C are respectively an elevation view, and views seen in directions A and B, of an embodiment of the integral optical head of the present invention.
Figure 9B:
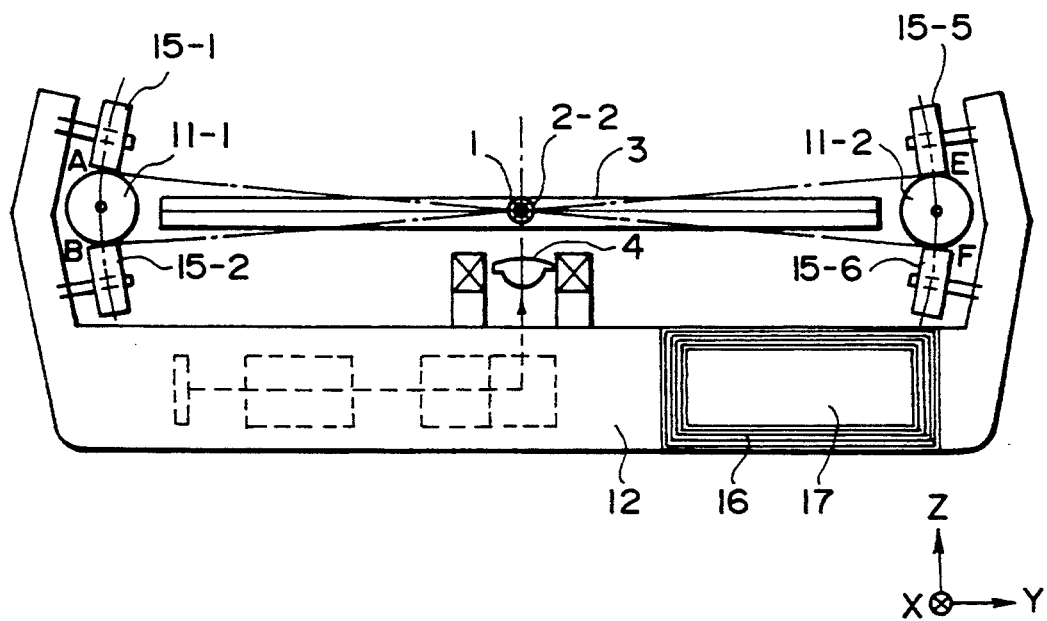
Figure 9C:
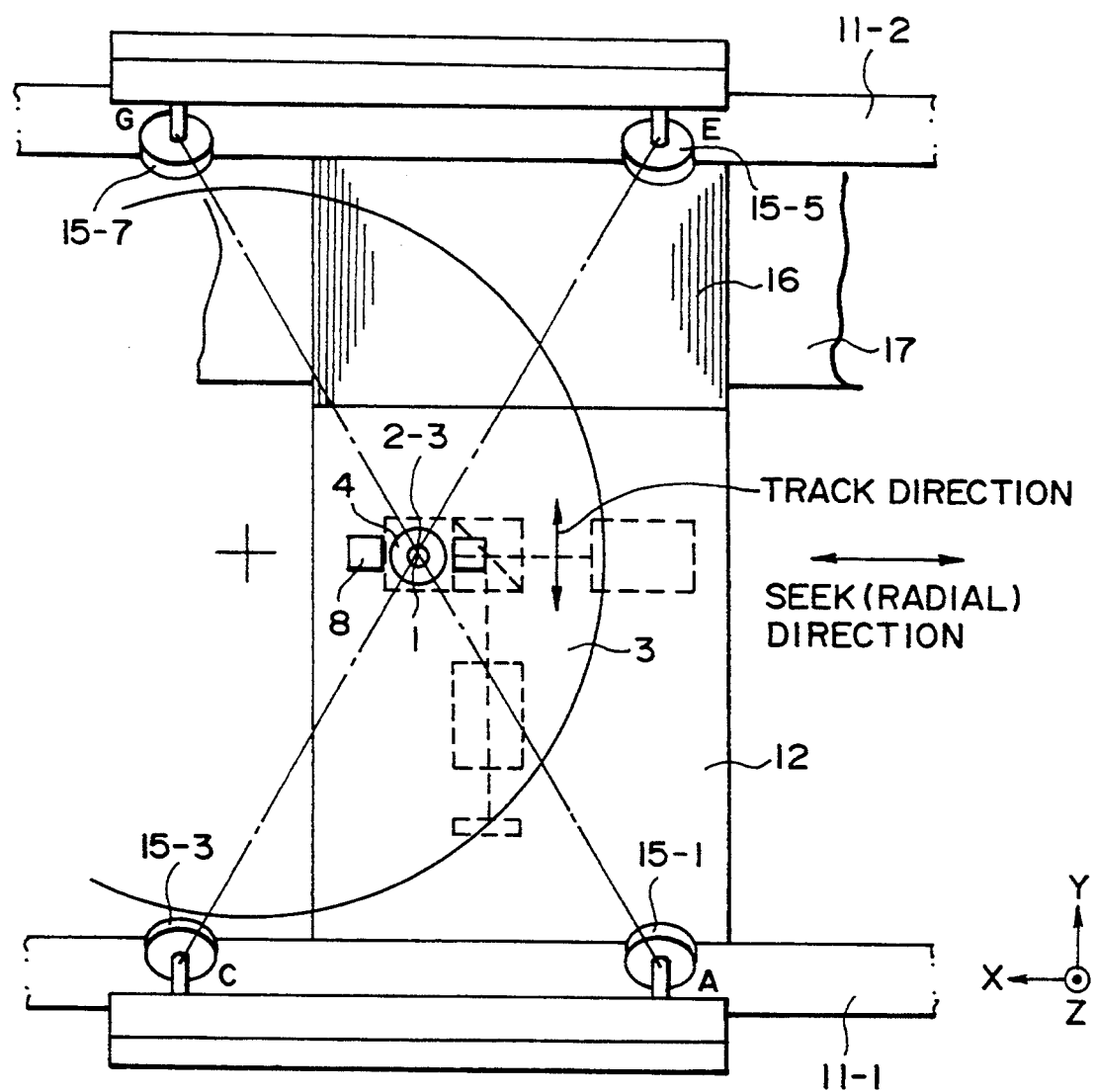

FIG. 9A is an elevation view, and FIGS. 9B and 9C are views respectively seen in directions A and B, of an optical head realizing the 1st, 2nd and 3rd embodiments of the present invention. In these drawings, a numeral 1 indicates the position of the light spot on the disk 3; 2-1 is the center of rotation of the base plate 12 in the z-x plane; 2-2 is the center of rotation of the base plate 12 in the y-z plane; and 2-3 is the center of rotation of the base plate in the x-y plane and coincides with the optical axis. In this embodiment the following relation is satisfied $f + R_{zx} = 0$ wherein f is the focal length of the objective lens 4 and $R_{zx}$ is the distance from the point 2-1 to the principal plane of the objective lens. As shown in FIG. 9A, the base plate 12 is supported by the rails 11 through eight bearings 15-1 to 15-8. Since the bearings are pressed to the rails 11 with uniform pressures at contacts A–H, the center of inclination (rotation) of the base plate 12 in the z-x plane is positioned at the point 2-1 which is the center of contact points A, B, C and D between the bearings and the rails. Similarly there stands a relation $f + R_{yz} = 0$ for the distance $R_{yz}$ from the point 2-2 to the image side principal plane of the objective lens, and the center of inclination (rotation) of the base plate 12 is positioned at the point 2-2 which is the center of the contact points A, B, E and F between the bearings and the rails. There are also shown a coil 16 and a yoke 17 constituting a linear motor for driving the base plate 12 in the seeking direction. Similarly, in the x-y plane, the center of inclination (rotation) of the base plate 12 is positioned at the point 2-3 at the center of the contact points A, C, E and G between the bearings and the rails.

Since the objective lens 4 in the present embodiment is composed of a thick single lens, the focal length f is defined as the distance from the image side principal plane to the image point, while $R_{zx}$ or $R_{yz}$ is defined as the distance from the center of rotation to the image side principal plane and can be considered as the sum of the distance to the objective lens and the distance between the principal points.

The amount of above-explained displacement of the light spot in the seeking direction is the sum of the amounts of displacement of the light spot resulting from the vibrations in the z-x and x-y planes, and has to be maintained at about 1/10 or less of the track pitch of the disk. Similarly the speed of displacement of the light spot in the track direction is the sum of the speeds of displacement of the light spot resulting from the vibrations in the y-z and x-y planes, and has to be maintained at about 0.2% or less of the rotating speed (moving speed) of the disk.

Figure 10:
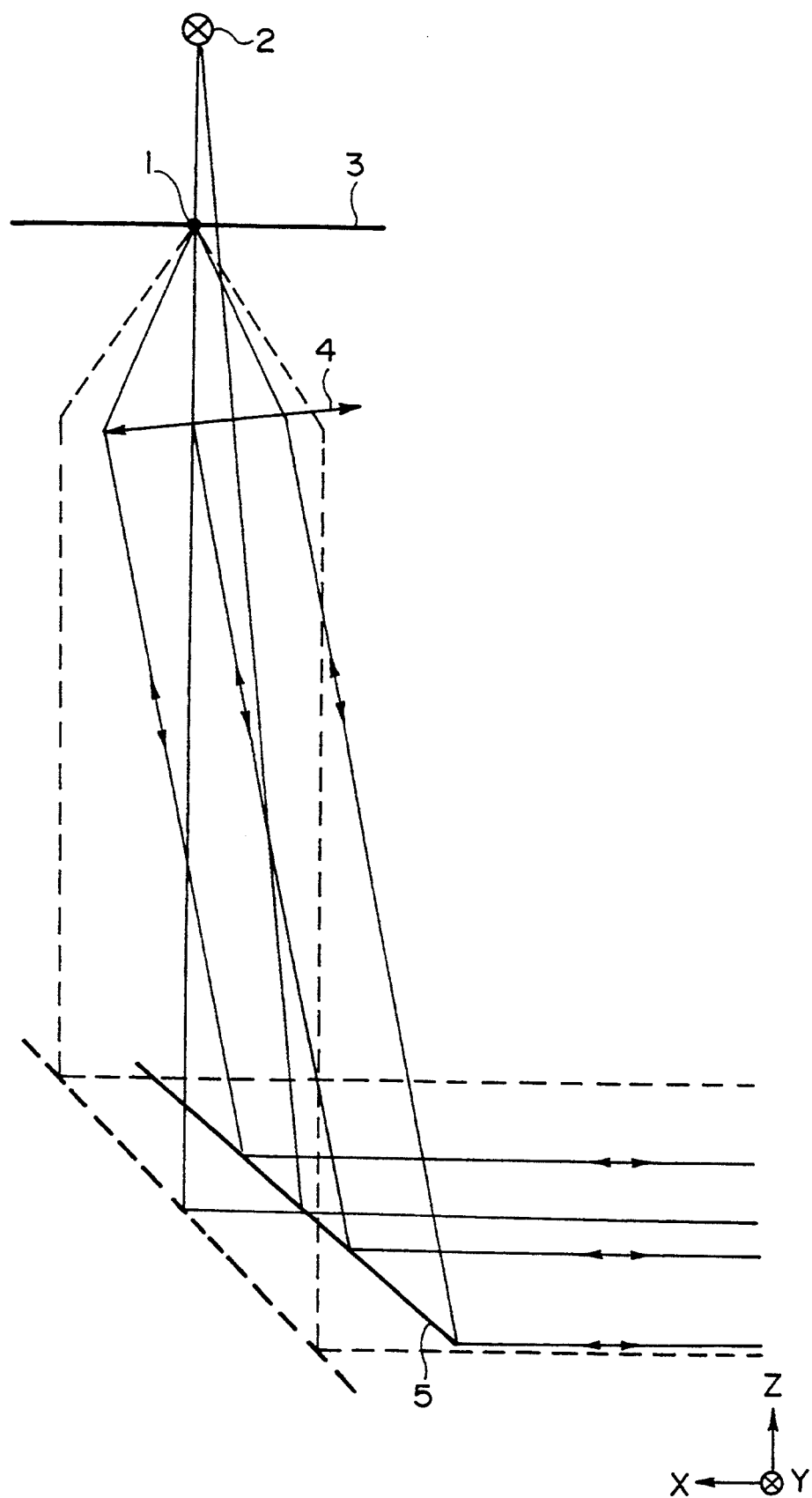
FIGS. 10 and 11 are views of the optical path relating to the center of inclination of the optical head in the z-x plane in another embodiment of the present invention.
Figure 11:
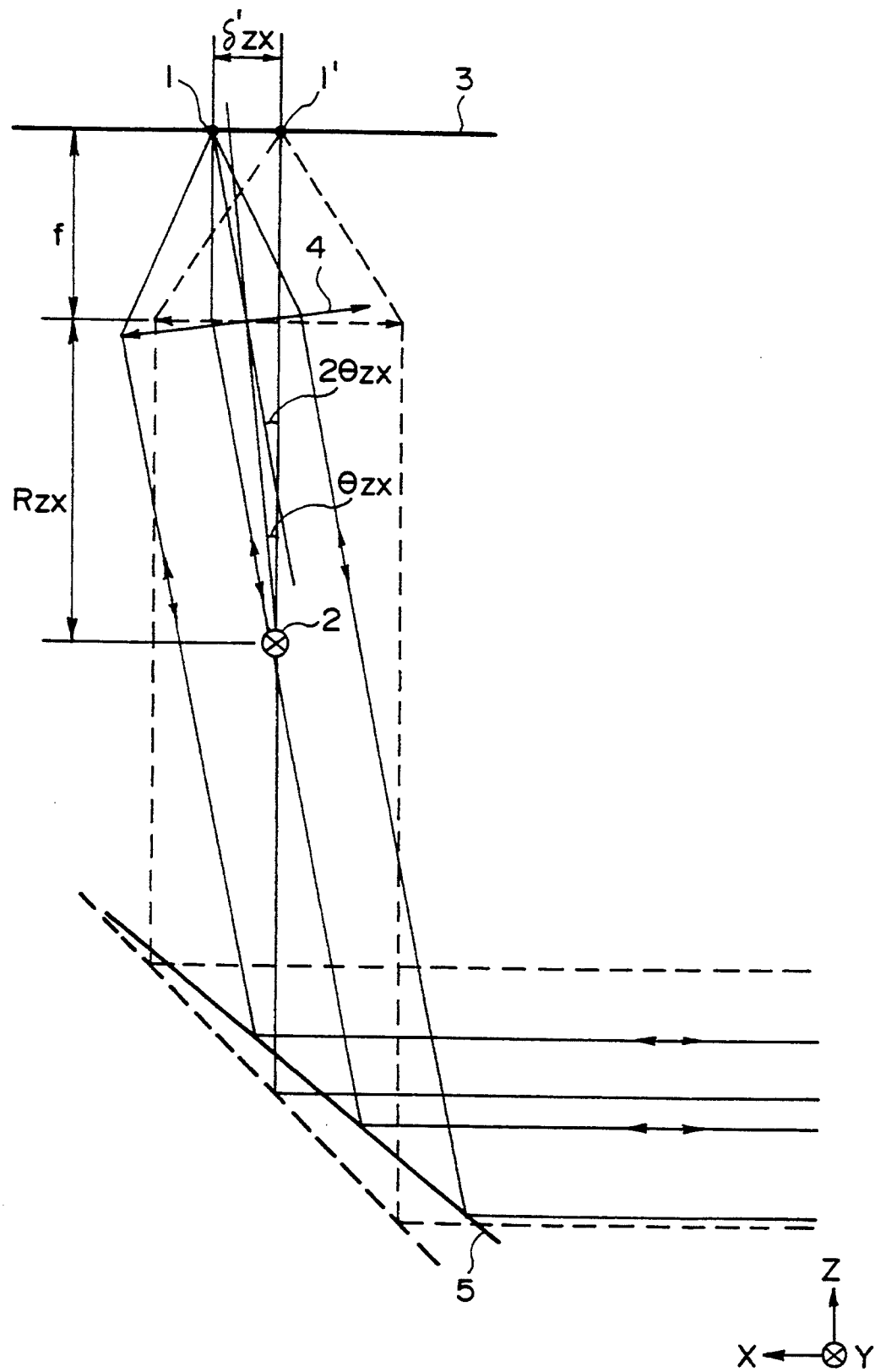

In the foregoing embodiments, the entire optical system of the optical head is mounted on the base plate 12. In the following there will be explained an embodiment employing a separated optical system in which a movable part is separated in the optical head. In this embodiment the base plate 12 is provided with an actuator, including the objective lens and the mirror, as the movable part, with an operating mode as shown in FIGS. 10 and 11, which illustrate a state of inclination or vibration of the base plate 12 in the z-x plane. In FIG. 11, a light spot 1 indicates the position, on the disk 3, displaced by the inclination $\theta_{zx}$ of the base plate 12, while a spot 1' corresponds to a state $\theta_{zx}=0$, and the distance between the spots 1 and 1' is represented by $\delta'_{zx}$. A numeral 2 indicates the center of inclination of the base plate 12, and can be considered as an equivalent center of inclination inducing the displacement of the light spot 1 when the base plate is twisted or vibrates.

When the base plate 12 of the separate type optical head is inclined or vibrates in the z-x plane due, for example, to the gap between the base plate 12 and the rails 11, the mirror 5 is by $\theta_{zx}$ to the incident light beam, so that the reflected light beam is inclined by $2\theta_{zx}$ and enters the objective lens 4 inclined by $\theta_{zx}$. The inclination between the disk and the incident light beam thereto is likewise $2\theta_{zx}$. The amount $\delta'_{zx}$ of displacement of the light spot on the disk can be represented as follows:

$$\delta'_{zx}=f\cdot\tan 2\theta_{zx}+R_{zx}\tan\theta_{zx}\approx(2f+R_{zx})\tan\theta_{zx} \quad (8)$$

wherein $R_{zx}$ is the distance from the center of inclination to the objective lens (distance from the center of inclination to the optical axis in the x-direction being assumed as zero for the purpose of simplicity), and f is the focal length of the objective lens.

As will be apparent from the equation (8), $\delta'_{xy}$ can be reduced by $2f+R_{zx}\to 0$. In FIG. 10, the following relation is satisfied $2f+R_{zx}=0$, so that the center of inclination is distanced by f in the z-direction from the position of the light spot on the disk. Also even when $2f+R_{zx}$ cannot be brought to zero, the stability of the servo system will not be a problem with respect to a tolerance of 0.1 μm for the tracking error in a disk with a track pitch of 1.6 μm as long as $|2f+R_{zx}|$ satisfies the following relation:

$$|2f+R_{zx}|\leq\delta_{zx}/\tan\theta_{zx}\approx 5\times 10^{-5}/\tan\theta_{zx} \ (mm) \quad (9)$$

even if the frequency $f_0$ of the base plate 12 is close to the gain crossing frequency $f_c$ of the tracking servo system. For example, for a condition $\theta_{zx}=2''$ there can be achieved $|2f+R_{zx}|\approx 5$ mm. Also if $f_0$ is lower than $f_c$, $\theta_{zx}$ and $|2f+R_{zx}|$ can be increased further as already explained in relation to the equation (2').

FIGS. 12 and 13 show a case in which the inclination or vibration of the base plate 12 takes place in the x-y plane. In FIG. 13, a light spot 1 indicates the position, on the disk 3, displaced by the inclination $\theta_{xy}$ of the base plate, while a light spot 1' corresponds to a case $\theta_{xy}=0$, and the distance between the spots 1 and 1' is represented by $\delta'_{xy}$. As FIG. 13 shows a situation where the center 2 of inclination is distanced by $R_{xy}$ in the x-direction from the optical axis, the displacement $\delta'_{xy}$ of the light spot appears in the track direction (y-direction). If the center 2 of inclination is distanced by $R_{xy}$ in the y-direction from the optical axis, the displacement $\delta'_{xy}$ of the light spot appears in the seeking (radial) direction (x-direction).

In such optical head of separated optical system, when the base plate 12 is inclined or vibrates in the x-y plane due, for example, to the gap between the base plate 12 and the rails 11, the mirror 5 rotates by $\theta_{xy}$ to the incident light beam whereby the reflected light beam is inclined approximately by $\theta_{xy}$ and enters the objective lens displaced in a parallel manner. The inclination of the incident beam to the disk is also $\theta_{xy}$. The amount $\delta'_{xy}$ of displacement of the light spot on the disk can be represented as follows:

if $\delta'_{xy}$ is in the seeking (radial) direction:

$$\delta'_{xy}\approx(R_{xy})_y\tan\theta_{xy} \quad (10)$$

if $\delta'_{xy}$ is in the track direction:

$$\delta'_{xy}\approx(f-(R_{xy})_x)\tan\theta_{xy} \quad (11)$$

wherein $\theta_{xy}$ is assumed to be a small angle; $R_{xy}$ is the distance from the center of inclination to the optical axis in the x- or y-direction; and $(R_{xy})_x$ and $(R_{xy})_y$ are respectively x- and y-components of $R_{xy}$.

Based on the relations (10) and (11), the arrangement should be made in such a manner that the amount of displacement of the light spot resulting from the inclination of the reflected light beam cancels that resulting from parallel displacement of the objective lens. Thus $\delta'_{xy}$ can be reduced by bringing $(R_{xy})_y$ in (10) and $(f-(R_{xy})_x)$ in (11) toward zero. In FIG. 12, the center 2 of inclination can be positioned at f from the optical axis in the -x direction.

Even when $(R_{xy})_y$ and $|f-(R_{xy})_x|$ cannot be brought to zero, the stability of the servo system will not be a problem as in the first and second embodiments, if $(R_{xy})_y$ and $|f-(R_{xy})_x|$ are within ranges defined by the following relations (12) and (13):

if $\delta'_{xy}$ is in the seeking (radial) direction:

$$(R_{xy})_y\leq 5\times 10^{-5}/\tan\theta_{xy} \ (mm) \quad (12)$$

if $\delta'_{xy}$ is in the track direction:

$$|f-(R_{xy})_x|\leq 5\times 10^{-4}/\tan\theta_{xy} \ (mm) \quad (13).$$

If the base plate 12 is inclined in the y-z plane, the second embodiment is applicable since there is no difference between the optical head of separated optical system and the optical head of integral optical system.

Figure 14C:
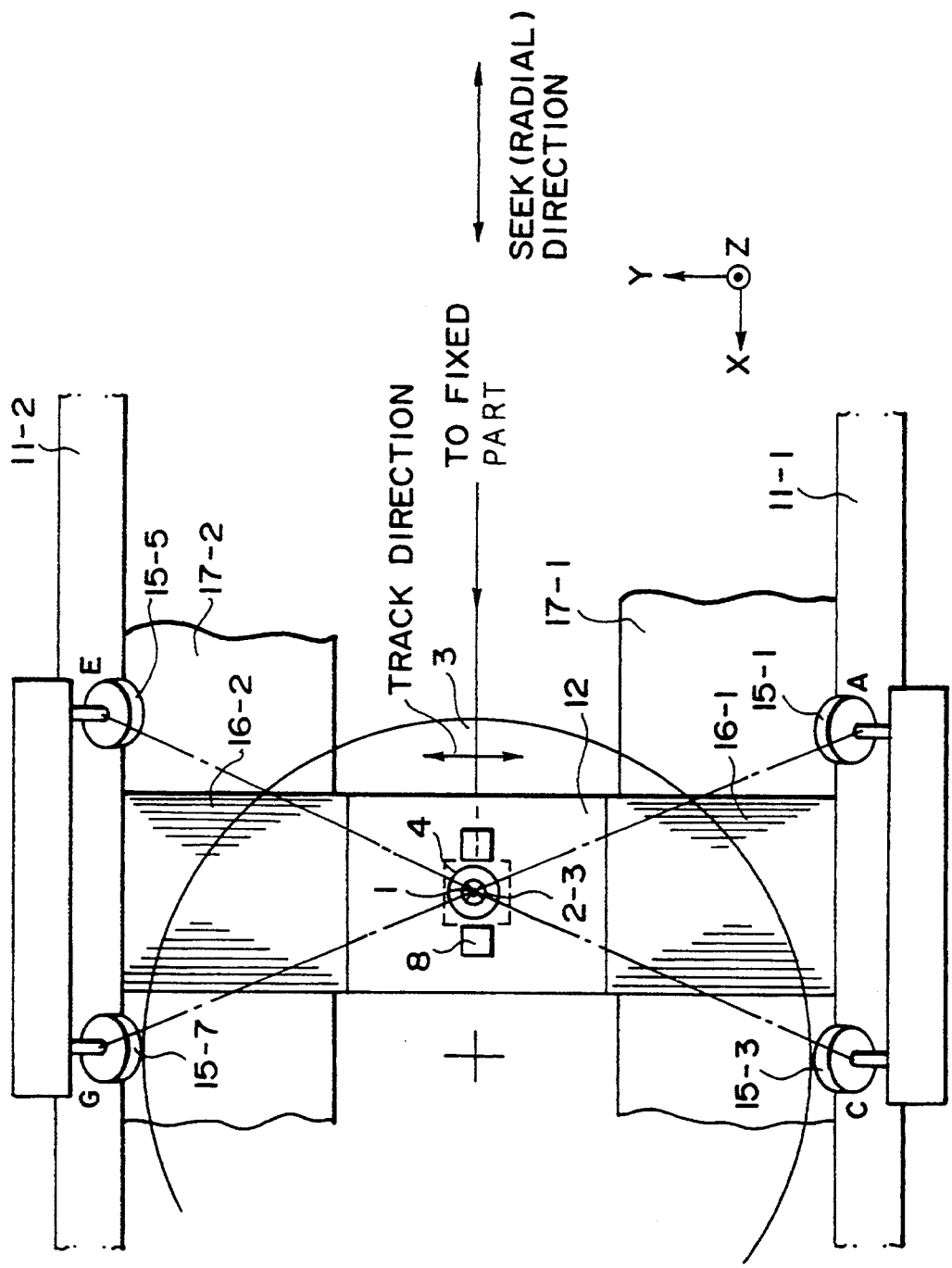

FIG. 14A is an elevation view, and FIGS. 14B and 14C are views respectively seen in directions A and B in FIG. 14A, of an optical head of a separated optical system of the present invention. In these drawings, a numeral 1 indicates the position of the light spot on the disk 3; 2-1 is the center of rotation of the base plate 12 in the z-x plane; 2-2 is the center of rotation of the base plate 12 in the y-z plane; and 2-3 is the center of rotation of the base plate in the x-y plane. There stands a relation $2f+R_{zx}=0$ wherein f is the focal length of the objective lens 4, and $R_{zx}$ is the distance from the point 2-1 to the image side principal plane of the objective lens. As shown in FIG. 14A, the base plate 12 is supported on the rails 11 by eight bearings 15-1 to 15-8. Since the bearings are pressed to the rails 11 with uniform pressures at contact points A–H, the center of inclination (rotation) of the base plate 12 in the z-x plane is positioned at the point 2-1 which is the center of contact points A, B, C and D between the bearings and the rails. Similarly there stands a relation $f+R_{yz}=0$ wherein R is the distance from the point 2-2 to the image side principal plane of the objective lens, and the center of inclination (rotation) of the base plate 12 is positioned at the point 2-2 which is the center of the contact points A, B, E and F between the bearings and the rails. There are also shown coils 16-1, 16-2 and yokes 17-1, 17-2 constituting a linear motor for driving base plate 12 in the seeking direction. In the separated optical system, there are often employed plural linear motors for driving the base plate in order to increase the coarse seeking speed.

As shown in FIG. 14C, the center of inclination (rotation) of the base plate 12 in the x-y plane is positioned at the point 2-3 which is the center of the contact points A, C, E and G between the bearings and the rails. Since $(R_{xy})_x=(R_{xy})_y=0$ at the point 2-3, the relation (10) is satisfied, but, in the relation (11), $\delta'_{xy}=f\cdot\tan\theta_{xy}\neq 0$. This is because the displacement of the light spot cannot be made zero for the inclination in the x-y plane, as the center of inclination of the base plate 12 in the z-x plane is selected at the point 2-1. In such case the center of inclination should be selected preferentially for the stricter tolerance. As the focal length of the objective lens is usually about 4 mm, a condition $\theta_{xy}<2''$ can sufficiently satisfy the relation (13), thereby stabilizing the servo system.

In the foregoing embodiments, a linear motor is employed for driving the optical head or the movable part thereof, but there may naturally be employed other seeking means. Also an objective lens of an infinite system is employed in the integral optical head, but there may be employed an objective lens of finite system. In such case, for selecting the center of inclination, there is preferably used the distance from the image side principal plane to the image, instead of the focal length of the objective lens.

In the following there will be given a mathematical explanation on the preferred amount of displacement of the light spot resulting from vibration or resonance in the foregoing embodiments.

There will be considered an integral optical head, in which all the optical system of the optical head is mounted on the base plate, in the vicinity of the gain crossing frequency:

in the seeking direction (x-direction):

$$\delta_{zx}=(f+R_{zx})\cdot\tan\theta_{zx}$$

$(\delta_{xy})_x=(R_{xy})_y\cdot\tan\theta_{xy}$, wherein $(\delta_{xy})_x$ is the x-component of $\delta_{xy}$, $$\delta_{zx}+(\delta_{xy})_x<P/10$$

$(f+R_{zx})\tan\theta_{zx}+(R_{xy})_y\cdot\tan\theta_{xy}<P/10$ wherein P is the track pitch; in the track direction (y-direction):

$$\delta_{yz}=(f+R_{yz})\cdot\tan\theta_{yz}$$

$(\delta_{xy})_y=(R_{xy})_x\tan\theta_{xy}$, wherein $(\delta_{xy})_y$ is the y-component of $\delta_{xy}$, $$\delta_{yz} + (\delta_{xy})_y = (f + R_{yz})\tan\theta_{yz} + (R_{xy})_x\tan\theta_{xy}$$

$$\frac{f_c\cdot\{(f + R_{yz})\cdot\tan\theta_{yz} + (R_{xy})_x\tan\theta_{xy}\}}{r\cdot f_d} \leq 0.002.$$

Then there will be considered an optical head of a separate optical system, in which the optical system of the optical head is separated into a movable part and a fixed part, in the vicinity of the gain crossing frequency:

in the seeking direction (x-direction):

$$\delta'_{zx}=(2f+R_{zx})\tan\theta_{zx}$$

$(\delta'_{xy})_x=(R_{xy})_y\cdot\tan\theta_{xy}$, wherein $(\delta'_{xy})_x$ is the x-component of $\delta'_{xy}$ $$\delta'_{zx}+(\delta'_{xy})_x\leq P/10$$

( $(2f+R_{zx})\cdot\tan\theta_{zx}+(R_{xy})_y\tan\theta_{xy}\leq P/10$ in the track direction (y-direction):

$\delta_{yz}=(f+R_{yz})\cdot\tan\theta_{yz}$ (same as in integral type)

$(\delta'_{xy})_y=(f-(R_{xy})_x)\cdot\tan\theta_{xy}$, wherein $(\delta'_{xy})_y$ is the y-component of $\delta'_{xy}$, $$\delta_{yz} + (\delta'_{xy})_y = (f + R_{yz})\cdot\tan\theta_{yz} + (f - (R_{xy})_y)\tan\theta_{xy}$$

$$\frac{f_c\{(f + R_{yz})\tan\theta_{yz} + (f - (R_{xy})_x)\cdot\tan\theta_{xy}\}}{r\cdot f_d} \leq 0.002.$$

According to the foregoing equations, the amount of displacement of the light spot in the seeking direction, which is the sum of amounts of displacement of the light spot resulting from the vibrations in the z-x plane and in the x-y plane, can be maintained at about 1/10 or less of the track pitch of the disk. Also the moving speed of the light spot in the track direction, which is the sum of the moving speeds of the light spot resulting from the vibrations in the y-z plane and the in the x-y plane, can be maintained at about 0.2% or less of the rotating speed of the disk.

In the present invention, as explained in the foregoing, even if the optical head or the movable part thereof vibrates in the seeking operation of the optical head, the system is set in advance in such a manner that the amount of displacement of the light spot resulting from inclination of the optical head or movable part in the vibration on a disk constituting the recording medium becomes sufficiently small in the track direction or in the perpendicular seeking direction on the disk, so that the servo system can be maintained stable and the access speed can be increased.

What is claimed is:

1. An optical head, comprising:

a light source;

a condenser lens for condensing a light beam from said light source as a small light spot on a predetermined track on a recording medium, said light source and said condenser lens being integrally mounted on a base; and tracking servo means for positioning the light spot in accordance with information on displacement between a track and the light spot, wherein a focus length f of said condenser lens, and a distance $R_{zx}$ from an inclination center of vibration or resonance of the base to said condenser lens in a z axis direction in a z-x plane are fixed in a coordinate system in which the tracking direction is in the x axis direction, and the track direction is in a y axis direction, and an optical axis of said condenser lens is in the z axis direction, such that the displacement between the track and the light spot $\delta_{zx}$ due to the vibration or resonance of the base in the z-x plane produced upon tracking satisfies:

$$\delta_{zx} = (f + Rzx) \cdot \tan\theta_{zx} \text{ and}$$

$$|f + R_{zx}| \leq 5 \times 10^{-5}/\tan\theta_{zx} \text{ (mm)}$$

where $\theta_{zx}$ is the inclination of the base produced by the vibration or resonance in the z-x plane.

2. An optical head, comprising:

a light source;

a condenser lens for condensing a light beam from said light source as a small light spot on a predetermined track on a recording medium, said light source and said condenser lens being integrally mounted on a base; and tracking servo means for positioning the light spot in accordance with information on displacement between a track and the light spot, wherein a distance $R_{xy}$ from an inclination center of vibration or resonance of the base to said condenser lens in a y axis direction in a x-y plane is fixed in a coordinate system in which the tracking direction is in the x axis direction, and the track direction is in the y axis direction, and an optical axis of said condenser lens is in a z axis direction, such that the displacement between the track and the light spot $\delta_{xy}$ due to the vibration or resonance of the base in the x-y plane produced upon tracking satisfies:

$$\delta_{xy} \simeq (R_{xy})_y \tan\theta_{xy} \text{ and}$$

$$(R_{xy})_y \leq 5 \times 10^{-5}/\tan\theta_{xy} \text{ (mm)}$$

where $(R_{xy})_y$ is a projection component of $R_{xy}$ to the y axis direction, $\theta_{xy}$ is the inclination of the base produced by the vibration or resonance in the x-y plane.

3. An optical head, comprising:

a light source;

a condenser lens for condensing a light beam from said light source as a small light spot on a predetermined track on a recording medium, said light source and said condenser lens being integrally mounted on a base; and tracking servo means for positioning the light spot in accordance with information on displacement between a track and the light spot, wherein a focus length f of said condenser lens, and a distance $R_{zx}$ from an inclination center of vibration or resonance of the base to said condenser lens in a z axis direction in a z-x plane and a distance $R_{xy}$ from an inclination center of vibration or resonance of the base to said condenser lens in the y axis direction in a x-y plane are fixed in a coordinate system in which the tracking direction is in the x axis direction, and the track direction is in the y axis direction, and an optical axis of said condenser lens is in the z axis direction, such that the displacement between the track and the light spot due to the vibration or resonance of the base produced upon tracking in the z-x plane and x-y plane, a frequency of the vibration or resonance is in the vicinity of a gain crossing frequency of said tracking servo means, satisfies:

$$(f+R_{zx}) \cdot \tan\theta_{zx} \pm (R_{xy})_y \tan\theta_{xy} < P/10$$

where $\theta_{zx}$ is the inclination of the base produced by the vibration or resonance in the z-x plane, $(R_{xy})_y$ is a projection component of $R_{xy}$ to the y axis direction, $\theta_{xy}$ is the inclination of the base produced by the vibration or resonance in the x-y plane, P is the track pitch.

4. An optical head, comprising:

a light source;

a condenser lens for condensing a light beam from said light source as a small light spot on a predetermined track on a rotating recording medium, said light source and said condenser lens being integrally mounted on a base; and tracking servo means for positioning the light spot in accordance with information on displacement between a track and the light spot to perform tracking using a sample-servo method, wherein a focus length f of said condenser lens, and a distance $R_{yz}$ from an inclination center of vibration or resonance of the base to said condenser lens in a z axis direction in a y-z plane are fixed in a coordinate system in which the tracking direction is in an x axis direction, and the track direction is in the y axis direction, and an optical axis of said condenser lens is in the z axis direction, such that a jitter due to the vibration or resonance of the base in the y-z plane produced upon tracking satisfies:

$$fc \cdot (f + R_{yz}) \cdot \tan\theta_{yz}/(r \cdot fd) \leq 0.002$$

where fc is a gain crossing frequency of a phase locked loop of said tracking servo means, fd is a rotation frequency of the recording medium, $\theta_{yz}$ is the inclination of the base produced by the vibration or resonance in the y-z plane, and r is a radius of the rotating recording medium.

5. An optical head, comprising:

a light source;

a condenser lens for condensing a light beam from said light source as a small light spot on a predetermined track on a rotating recording medium, said light source and said condenser lens being integrally mounted on a base; and tracking servo means for positioning the light spot in accordance with information on displacement between a track and the light spot to perform tracking using a sample-servo method, wherein a focus length f of said condenser lens, and a distance $R_{yz}$ from an inclination center of vibration or resonance of the base to said condenser lens in a z axis direction in an y-z plane, and a distance $R_{xy}$ from an inclination center of vibration or resonance of the base to said condenser lens in an x axis direction in an x-y plane are fixed in a coordinate system in which the tracking direction is in the x axis direction, and the track direction is in the y axis direction, and an optical axis of said condenser lens is in the z axis direction, such that a jitter due to the vibration or resonance of the base in the y-z plane and the x-y plane produced upon tracking satisfies:

$$fc \cdot \{(f+R_{yz}) \cdot \tan\theta_{yz} + (R_{xy})_x \tan\theta_{xy}\}/(r \cdot fd) < 0.002$$

where fc is a gain crossing frequency of a phase locked loop of said tracking servo means, fd is a rotation frequency of the recording medium, $\theta_{yz}$ is the inclination of the base produced by the vibration or resonance in the y-z plane, $(R_{xy})_x$ is a projection component of $R_{xy}$ to the x axis direction, $\theta_{xy}$ is the inclination of the base produced by the vibration or resonance in the x-y plane, and r is a radius of the rotating recording medium.

6. An optical head, comprising:
a light source;
a condenser lens for condensing a light beam from said light source as a small light spot on a predetermined track on a recording medium; and
tracking servo means for positioning the light spot in accordance with information on displacement between a track and the light spot,
said light source being fixed, and wherein said condenser lens and a mirror, for directing an optical path at a substantially right angle from a tracking direction to an optical axis direction of said condenser lens, are integrally mounted on a base and are movable in the tracking direction,
wherein a focus length f of said condenser lens, and a distance $R_{zx}$ from an inclination center of vibration or resonance of the base to said condenser lens in a z axis direction in a z-x plane are fixed in a coordinate system in which the tracking direction is in the x axis direction, and the track direction is in a y axis direction, and an optical axis of said condenser lens is in the z axis direction, such that the displacement between the track and the light spot $\delta'_{zx}$ due to the vibration or resonance of the base in the z-x plane produced upon tracking satisfies:

$$\delta'_{zx} = (2f + R_{zx}) \cdot \tan\theta_{zx} \text{ and}$$
$$|2f + R_{zx}| \leq 5 \times 10^{-5}/\tan\theta_{zx} \text{ (mm)}$$

where $\theta_{zx}$ is the inclination of the base produced by the vibration or resonance in the z-x plane.

7. An optical head, comprising:
a light source;
a condenser lens for condensing a light beam from said light source as a small light spot on a predetermined track on a recording medium; and
tracking servo means for positioning the light spot in accordance with information on displacement between a track and the light spot,
said light source being fixed, and wherein said condenser lens and a mirror, for directing an optical path at a substantially right angle from a tracking direction to an optical axis direction of said condenser lens, are integrally mounted on a base and movable in the tracking direction,
wherein a distance $R_{xy}$ from an inclination center of vibration or resonance of the base to said condenser lens in a y axis direction in an x-y plane is fixed in a coordinate system in which the tracking direction is in the x axis direction, and the track direction is in the y axis direction, and an optical axis of said condenser lens is in a z axis direction, such that the displacement between the track and the light spot $\delta_{xy}$ due to the vibration or resonance of the base in the x-y plane produced upon tracking satisfies:

$$\delta_{xy} \simeq R_{xy} \cdot \tan\theta_{xy}$$
$$(R_{xy})_y \leq 5 \times 10^{-5}/\tan\theta_{xy} \text{ (mm)}$$

where $(R_{xy})_y$ is a projection component of $R_{xy}$ to the y axis direction, and $\theta_{xy}$ is the inclination of the base produced by the vibration or resonance in the x-y plane.

8. An optical head, comprising:
a light source;
a condenser lens for condensing a light beam from said light source as a small light spot on a predetermined track on a recording medium; and
tracking servo means for positioning the light spot in accordance with information on displacement between a track and the light spot,
said light source being fixed, and wherein said condenser lens and a mirror, for directing an optical path at a substantially right angle from a tracking direction to an optical axis direction of said condenser lens, are integrally mounted on a base and movable in the tracking direction,
wherein a focus length f of said condenser lens, and a distance $R_{zx}$ from an inclination center of vibration or resonance of the base to said condenser lens in a z axis direction in a z-x plane and a distance $R_{xy}$ from an inclination center of vibration or resonance of the base to said condenser lens in a y axis direction in a x-y plane are fixed in a coordinate system in which the tracking direction is in the x axis direction, and the track direction is in the y axis direction, and an optical axis of said condenser lens is in a z axis direction, such that the displacement between the track and the light spot due to the vibration or resonance of the base produced upon tracking in the z-x plane and x-y plane, a frequency of the vibration or resonance is in the vicinity of a gain crossing frequency of said tracking servo means, satisfies:

$$(2f+R_{zx}) \cdot \tan\theta_{zx} + (R_{xy})_y \tan\theta_{xy} \leq P/10$$

where $\theta_{zx}$ is the inclination of the base produced by the vibration or resonance in the z-x plane, $(R_{xy})_y$ is a projection component of $R_{xy}$ to the y axis direction, $\theta_{xy}$ is the inclination of the base produced by the vibration or resonance in the x-y plane, and P is the track pitch.

9. An optical head, comprising:
a light source;
a condenser lens for condensing a light beam from said light source as a small light spot on a predetermined track on a recording medium; and
tracking servo means for positioning the light spot in accordance with information on displacement between a track and the light spot to perform said tracking using a sample-servo method,
said light source being fixed, and wherein said condenser lens and a mirror, for directing an optical path at a substantially right angle from a tracking direction to an optical axis direction of said condenser lens, are integrally mounted on a base and movable in the tracking direction, wherein a focus length f of said condenser lens, and a distance $R_{yz}$ from an inclination center of vibration or resonance of the base to said condenser lens in a z axis direction in a y-z plane are fixed in a coordinate system in which the tracking direction is in an x axis direction, and the track direction is in the y axis direction, and an optical axis of said condenser lens is in the z axis direction, such that a jitter due to the vibration or resonance of the base in the y-z plane produced upon tracking satisfies:

$$fc \cdot (f+R_{yz}) \cdot \tan\theta_{yz}/(r \cdot fd) \leq 0.002$$

where fc is a gain crossing frequency of a phase locked loop of said tracking servo means, fd is a rotation frequency of the recording medium, $\theta_{yz}$ is the inclination of the base produced by the vibration or resonance in the y-z plane, and r is a radius of the rotating recording medium.

10. An optical head, comprising:
a light source;
a condenser lens for condensing a light beam from said light source as a small light spot on a predetermined track on a recording medium; and
tracking servo means for positioning the light spot in accordance with information on displacement between a track and the light spot to perform tracking using a sample-servo method,
said light source being fixed, and wherein said condenser lens and a mirror, for directing an optical path at a substantially right angle from a tracking direction to an optical axis direction of said condenser lens, are integrally mounted on a base and movable in the tracking direction, wherein a focus length f of said condenser lens, and a distance $R_{yz}$ from an inclination center of vibration or resonance of the base to said condenser lens in a z axis direction in an y-z plane, and a distance $R_{xy}$ from an inclination center of vibration or resonance of the base to said condenser lens in an x axis direction in an x-y plane are fixed in a coordinate system in which the tracking direction is in the x axis direction, and the track direction is in the y axis direction, and an optical axis of said condenser lens is in the z axis direction, such that a jitter due to the vibration or resonance of the base in the y-z plane and the x-y plane produced upon tracking satisfies:

$$fc \cdot \{(f+R_{yz}) \cdot \tan\theta_{yz} + (f-(R_{xy})_x) \cdot \tan\theta_{xy}\}/(r \cdot fd) < 0.002$$

where fc is a gain crossing frequency of a phase locked loop of said tracking servo means, fd is a rotation frequency of the recording medium, $\theta_{yz}$ is the inclination of the base produced by the vibration or resonance in the y-z plane, $(R_{xy})_x$ is a projection component of $R_{xy}$ to the x axis direction, $\theta_{xy}$ is the inclination of the base produced by the vibration or resonance in the x-y plane, and r is a radius of the rotating recording medium.

* * * * *

UNITED STATES PATENT AND TRADEMARK OFFICE
CERTIFICATE OF CORRECTION

PATENT NO. : 5,386,404           Page 1 of 3
DATED : January 31, 1995
INVENTOR(S) : OSAMU KOYAMA It is certified that error appears in the above-indentified patent and that said Letters Patent is hereby corrected as shown below:

COLUMN 1

Line 30, "Also" should read --Also,--.

COLUMN 2

Line 46, "$\delta_{zx}$" should read --$\delta'zx$--.

COLUMN 3

Line 13, "rendered-possible" should read --rendered possible--.

COLUMN 4

Line 34, "vibraiton" should read --vibration--.

COLUMN 5

Line 57, "Also" should read --Also,--.
     Line 65, "$Q_{xy}=0$" should read --$\theta_{xy}=0$--.

COLUMN 6

Line 24, "Also" should read --Also,--.
     Line 48, "embodiment" should read --embodiment,--; "satisfied" should read --satisfied:--.
     Line 49, "$f+R_{zx}=0$" should read --$f+R_{zx}=0$,--.

UNITED STATES PATENT AND TRADEMARK OFFICE
CERTIFICATE OF CORRECTION

PATENT NO. : 5,386,404

DATED : January 31, 1995

INVENTOR(S) : OSAMU KOYAMA

It is certified that error appears in the above-indentified patent and that said Letters Patent is hereby corrected as shown below:

COLUMN 7

Line 17, "Similarly" should read --Similarly,--.
     Line 25, "following" should read --following,--.
     Line 61, "satisfied" should read --satisfied:--.

COLUMN 8

Line 7, "Also" should read --Also,--.

COLUMN 9

Line 12, "$2f+R_{zx}=0$" should read --$2f+R_{zx}=0$,--.
     Line 22, "Similarly" should read --Similarly,--;
           "$f+R_{yz}=0$" should read --$f+R_{yz}=0$,--;
           and "R" should read --$R_{yz}$--.
     Line 51, "Also" should read --Also,--.

UNITED STATES PATENT AND TRADEMARK OFFICE
CERTIFICATE OF CORRECTION

PATENT NO. : 5,386,404

DATED : January 31, 1995

INVENTOR(S) : OSAMU KOYAMA

It is certified that error appears in the above-indentified patent and that said Letters Patent is hereby corrected as shown below:

COLUMN 10

Line 32, "$(\ \ (2f+R_{zx})\cdot\tan\theta_{zx}+(R_{xy})_y\tan\theta_{xy}\leq P/10$" should read --$(\because(2f+R_{zx})\cdot\tan\theta_{zx}+(R_{xy})_y\tan\theta_{xy}\leq P/10$--.
Line 49, "Also" should read --Also,--.
Line 52, "the" (second occurrence) should be deleted.

Signed and Sealed this

Second Day of May, 1995

Attest:

BRUCE LEHMAN

Attesting Officer   Commissioner of Patents and Trademarks